United States Patent [19]

Zimmerman et al.

[11] Patent Number: 4,705,438
[45] Date of Patent: Nov. 10, 1987

[54] MACHINING CENTER HAVING AN INCLINABLE VACUUM-HOLDING WORKTABLE

[75] Inventors: Sanford S. Zimmerman, Westport; Louis W. Syarto, Fairfield, both of Conn.

[73] Assignee: Wesflex International Corporation, Westport, Conn.

[21] Appl. No.: 898,221

[22] Filed: Aug. 20, 1986

[51] Int. Cl.⁴ ............................ B23C 1/12; B23Q 1/04
[52] U.S. Cl. ........................................ 409/132; 51/235; 108/9; 269/21; 409/137; 409/168; 409/224; 409/235
[58] Field of Search ....................... 269/21, 13, 14, 15; 279/3; 408/56, 67, 68; 409/235, 236, 237, 80, 131, 137, 197, 164, 168, 219, 220, 903, 204, 205, 212, 132, 224; 51/235; 29/DIG. 50, DIG. 61, DIG. 101; 108/9

[56] References Cited

U.S. PATENT DOCUMENTS

| | | | |
|---|---|---|---|
| 3,880,047 | 4/1975 | Dosier | 409/134 |
| 4,301,999 | 11/1981 | Higgins et al. | 269/21 |
| 4,397,245 | 8/1983 | Washburn | 108/9 |

OTHER PUBLICATIONS

Heian Iron Works Ltd., Hamamatsu, Japan, (no date).
Forest-Line of 124, BD Haussmann, 75008, Paris, France, (no date).

Primary Examiner—Z. R. Bilinsky
Attorney, Agent, or Firm—Perman & Green

[57] ABSTRACT

A material machining center for the machining of workpieces of varying size and of various materials has a worktable supported by a base assembly. The worktable has a vacuum table for immovably holding the workpiece during the machining thereof. The machining center also has a gantry assembly movably mounted on the worktable, the gantry assembly further has a workhead assembly movably mounted thereon and a machining tool adapted for movement. The movements of the gantry assembly, the workhead assembly and the machining tool define a coordinate system having an X, Y, and Z axis, respectively. The machining center further includes a means for controllably inclining the worktable relative to the base assembly whereby dust and chips created during the machining of the workpiece fall from the workpiece to the floor. The means for controllably inclining the worktable is disclosed in an illustrative embodiment to be a hydraulic cylinder having an extendable piston rod for applying an upwardly directed force to the worktable, thereby causing the worktable to rotate about a hinge assembly provided between the worktable and the base assembly. The vacuum table has an open-frame construction and is comprised of a plurality of hollow members, thereby both reducing the weight of the vacuum table and facilitating the removal of dust and chips from the workpiece.

33 Claims, 4 Drawing Figures

MACHINING CENTER HAVING AN INCLINABLE VACUUM-HOLDING WORKTABLE

BACKGROUND OF THE INVENTION

The present invention relates to material machining centers and, in particular, it relates to a material machining center wherein a vacuum-holding worktable is controllably inclinable over a zero to ninety degree angle.

A material machining center typically is comprised of a worktable orientated in a fixed horizontal position whereon the workpiece, or material to be machined, is held in place by vacuum. A typical type of machining center is known as a router such as the Model NE-2SE, manufactured by Heian Iron Works Ltd. of Hamamatsu, Japan. In order to distribute the vacuum over the surface of the table the table maay be provided with a hollow interior chamber coupled to a vacuum pump for reducing the air pressure within the chamber. Disposed in a regular array over an upper surface of the worktable are a plurality of orifices communicating with the internal vacuum chamber. A back surface of the workpiece to be machined is placed upon the upper surface of the worktable such that it overlies some number of orifices. The pressure differential existing between the upper surface of the workpiece, due to atmospheric pressure, and the back surface of the workpiece, which experiences reduced pressure, is sufficient to hold the workpiece immovable during the machining operation. In order to maintain a sufficient amount of vacuum the orifices not covered by the workpiece are typically covered by a second sheet of material known as a spoiler which is typically provided with an opening of the proper size and dimensions to accommodate the workpiece therein. As can be appreciated, this second sheet of material may be required to be stored when not in use. As may be further appreciated, the preparation and storage of such a sheet adds to the cost of the workpiece machining operation.

The actual machining operation is typically accomplished by the movements of a rotating machine tool, such as a router, in a predefined manner within an X, Y, Z coordinate system, the coordinate system being relative to the upper surface of the material.

In order to effectuate the controlled movement of the tool, a programmable controller is provided for controlling a plurality of servomotors which in turn cause the movement of the tool horizontally in an X, Y plane and, additionally, the up and down movement of the rotating tool in a Z axis.

In one such type of machining center the rotational output of the X-axis servomotor is coupled by a pair of ball screws to move a gantry assembly, upon which is movably mounted a rotating spindle holding the tool rides, along the length of the material. Movement in the Y-axis across the width of the material is accomplished by another ball screw coupled to the Y-axis servomotor which causes the movement of the tool along the gantry assembly. The up and down movement of the tool itself in the Z-axis is accomplished by the Z-axis servomotor which is also typically mounted on the gantry assembly.

A particular problem associated with such material machining centers is that an operator may experience potentially serious lower back strain when loading and unloading a sheet of material. Due to the fact that the worktable is fixed in a horizontal plane, the operator must lean over the worktable surface when handling the material. Inasmuch as a sheet of material, such as composition board, may weigh in excess of 75 pounds, a serious operator safety problem is created.

Another problem created by the horizontally disposed machining centers of the prior art is that a buildup of dust and chips may occur upon the surface of the material during the machining operation. Although such machines are typically provided with a vacuum cleaner-like dust collector to remove dust and chips, a significant portion may escape collection and remain on the worksurface, where interference with the operation of the rotating tool may occur. This problem is especially acute at high spindle rotational speeds, as is common when machining such materials as composition board and certain plastics.

A still further problem created by machining centers which have their worktable fixed in a horizontal plane is that they are not readily adaptable to operation with automated workpiece transfer systems. Such systems, which may be comprised of rolling conveyors, are typically utilized to automatically transfer a workpiece from one machining center to another, where further machining operatons are performed. Such a transfer system is especially advantageous when two or more types of tools are required to perform the desired work. Instead of requiring a tool change part way through the operation, the workpiece is instead automatically transferred to another machining center having the required tool. Thus the workpiece throughput is increased and financial savings are realized.

It is therefore an objective of the present invention to provide a machining center which may have a workpiece loaded or unloaded without unduly exposing the operator to a risk of injury.

It is a further objective of the present invention to provide a machining center which inhibits the buildup of dust and chips produced during the machining operation, thereby reducing the possibility of tool damage and other problems created by such a buildup.

It is a further objective of the present invention to provide a machining center which is more readily adaptable to integration with automatic workpiece transfer systems.

It is a further objective of the present invention to provide a machining center having a lightweight vacuum-holding worktable which is readily adaptable to holding workpieces of various sizes without requiring a spoiler sheet to maintain a sufficient vacuum and, in addition, facilitates the removal of dust and chips from the workpiece.

It is a still further objective of the present invention to provide a machining center having an inclinable worktable.

SUMMARY OF THE INVENTION

The problems of the prior art are overcome and the foregoing objectives are realized by a machining center which, in accordance with the invention, has a vacuum-holding worktable which is inclinable over a wide range of angles. In addition, such a machining center has a vacuum table which is constructed in a lightweight open-frame manner having a plurality of hollow members for selectively distributing the vacuum over the surface of the worktable.

In an illustrative embodiment, a machining center having three servomotors for controllably positioning a machining tool in an X, Y, Z, coordinate frame relative to a surface of a workpiece is disclosed. In accordance with the invention, the worktable is hinged along one edge to a supporting base, the worktable further being coupled to linearly extendable piston rod of a hydraulic cylinder. Activation of the cylinder results in an extension of the piston rod, which extension further results in the rotation of the worktable about the hinged edge thereby causing the worktable to be angularly inclined relative to the base assembly. The inclination of the worktable facilitates the manual placement thereon and the removal therefrom of a workpiece. In addition, such an angular inclination results in dust and chips which escape collection by a dust collector being removed from the workpiece surface by the action of gravity. The open-frame type of construction of the vacuum table results in a vacuum table which is lighter in weight than vacuum tables of the prior art and also further facilitates the removal of dust and chips from the area of the workpiece. In addition the vacuum table has orifices distributed over the surfaces of the frame members, which orifices are adapted to be easily plugged when not in use, thereby eliminating the requirement for a spoiler sheet to block the orifice openings. Similarly, the orifices provide for the attachment of vacuum couplers of uniform and simple construction which may be placed in a desired pattern suitable for accommodating the rear surface area of the workpiece.

The controllable angle of inclination of the worktable surface further results in the machining center of the invention being more readily integrated with automatic workpiece transfer systems inasmuch as a workpiece may be readily transported edgewise by rolling conveyors between machining centers. The workpiece may then be subsequently more readily positioned upon and removed from the inclined worktable surface in an automatic or semiautomatic fashion.

The method of operation the machining center includes the positioning of the workpiece on the vacuum table, activating the clamping means such as a vacuum table means for immovably holding the workpiece and inclining the worktable at an angle. The inclining step may be carried out before, during or after the workpiece is positioned on the table.

BRIEF DESCRIPTION OF THE DRAWINGS

The foregoing aspects and other features of the invention are explained in the following description, taken in connection with the accompanying drawing wherein.

DETAILED DESCRIPTION OF THE INVENTION

Figure 1:
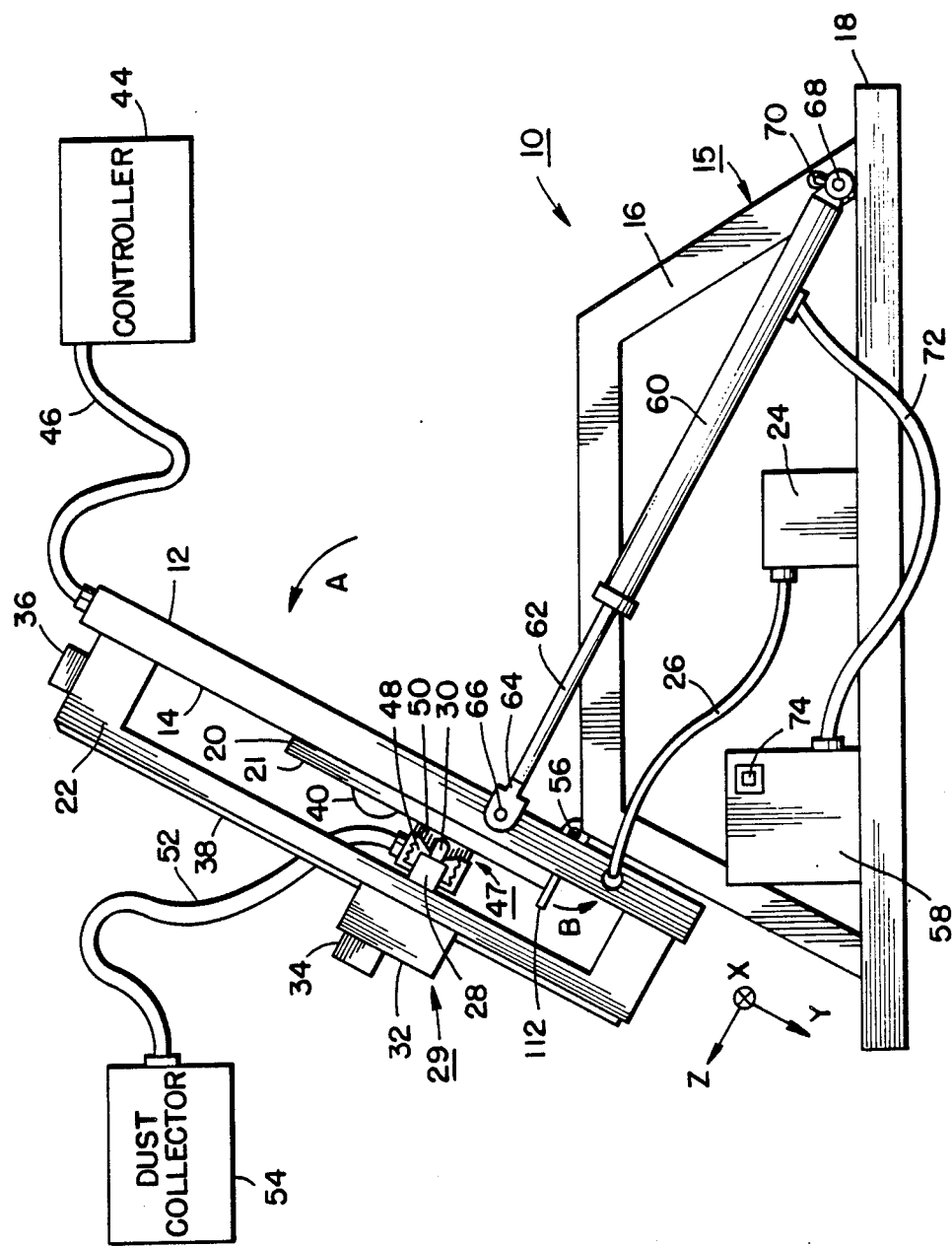
FIG. 1 is an end view of a machining center constructed in accordance with the invention.

Referring now to the drawings, and particularly to FIG. 1 thereof, there is seen a machining center generally designated by the numeral 10 which comprises a worktable 12 having a worksurface 14 and which in turn is supported by a base assembly 15 comprised of legs 16 rigidly fixed to a base 18. The machining center is shown in FIG. 1 with a workpiece 20, a relatively large sheet of composition board for example, positioned beneath a gantry assembly 22.

Workpiece 20 is held in place upon surface 14 by atmospheric pressure due to a portion of the interior region of table 12 being partially evacuated by a vacuum pump 24. Pump 24, which may be a Model No. VFC-603A manufactured by Fuji Electric Corporation of America of New York, N.Y., is connected to table 12 by a suitable vacuum line 26.

In order that an upper surface 21 of workpiece 20 may be machined gantry assembly 22 has movably mounted thereon workhead assembly 29 comprised of a rotating spindle 28 adapted for holding a machining tool 30, which tool may be a router, or a drill or a laser for example. Spindle 28 in mechanically coupled to the output of a suitable motor 32 whereby spindle 28 is caused to rotate at a desired rate. Spindle 28 is further coupled to a first servomotor 34 whereby an up and down motion of the tool 30 is achieved, such an up and down motion being in a vertical or Z-axis relative to an upper surface 21 of workpiece 20. The movement of tool 30 along a transverse or Y-axis relative to surface 21 is accomplished by a second servomotor 36, the output of which is coupled by a well known ball gear assembly (not shown) operable for moving workhead assembly 29 upon a pair of opposed linear guides 38 (only one of which is shown in FIG. 1), thereby effectuating the movement of assembly 29 along the gantry assembly 22. The movement of tool 30 along a longitudinal or X-axis relative to the surface 21 is accomplished by a third servomotor 40, the output of which is coupled by a pair of ball screw assemblies (not shown) operable for moving the gantry assembly 22 over the worktable surface 14. As may be more clearly seen in FIG. 2, gantry assembly 22 rides upon a pair of opposed linear guides 42, the guides 42 being disposed upon the outer edges of the worktable surface 14 along the X-axis.

Servomotors 34, 36 and 40 may be of the type known as a Model No. 5M and 10M manufactured by General Numerics of Elkgrove Village, Ill. Control of these motors is achieved by a programmable controller 44, which controller may be a Model No. OMA manufactured by General Numerics of Elkgrove Village, Ill. As is well known, a controller such as controller 44 is operable for storing within data representative of X, Y and Z position information required to perform a desired machining operation upon the workpiece 20. Such a controller is further operable to control the rotation of servomotors 34, 36 and 40 in order to position tool 30 in accordance with the X, Y and Z position information. Controller 44 is coupled to system 10 by a suitable cable 46, which cable may be comprised of a plurality of conductors for interconnecting the servo motors to controller 44.

In order to facilitate the removal of dust and chips created by the action of tool 30 during the machining of workpiece 20 the workhead assembly 29 may be provided with a brush assembly 47 comprised of a collar 48 having attached bristles 50 descending therefrom. Such a brush assembly 47 is mounted such that it surrounds tool 30, resulting in the area of surface 21 immediately adjacent to the rotating tool 30 being enclosed within the brush assembly 47. A suitable flexible air conduit 52 is attached to an opening made within collar 48 such that the partial vacuum created by a dust collector 54, which may be a Model No. UMA 154G manufactured by DCE Vokes of Jeffersontown, Ky. will remove a portion of the dust and chips created to tool 30.

As may be realized, that portion of the dust and chips not removed by dust collector 54 will, if worktable 12 is oriented in a horizontal plane, remain upon the surface 21 of workpiece 20. This remaining portion may thereafter interfere with the proper operation of tool 30, resulting in possible damage to the tool 30 or to the surface 21 of the workpiece 20.

As may be further realized, such a horizontally disposed worktable creates a possible safety hazard to an operator who must load and unload the workpiece 20 in that the operator is required to lean over an edge of the worktable 12 in order to properly position the workpiece, thereby creating a strain in the region of the lower back.

The machining center 10 of the invention overcomes these and other problems of the prior art machining centers by providing a means to incline the worktable 12 at a desired angle. Such an inclined worktable is advantageous in that the portion of dust and chips not collected by dust collector 54 are free to fall to the floor or into a suitably disposed underfloor vacuum or conveyor system. Additionally, the inclined worktable allows an operator to more readily load and unload the workpiece without having to lean or bend over the worktable while holding the workpiece. Other advantages accruing to a machining center constructed in accordance with the invention will be made apparent in the description of the invention which follows.

The worktable may be inclined, e.g. inclined at an angle to horizontal or brought to a predetermined or home position or brought back to a horizontal position, at any time during the use of the machining center. For instance, it may be inclined before the workpiece is positioned on the vacuum table or after the workpiece is so positioned. It may even be inclined during the positioning of the workpiece if operational circumstances so dictate. The same considerations apply with regard to activating the workpiece clamping means such as the vacuum table means for immovably holding the workpiece. Likewise, the worktable may be inclined every time a new workpiece is placed or about to be placed on it or may be inclined once before, after or during the time the workpiece is placed in it and left in that position while a plurality of workpieces are processed through the machining center.

As may be seen in FIG. 1, worktable 12 is rotatably coupled by a hinge means 56 to an upper portion of base assembly 15. Hinge means 56 may be comprised of a single hinge running the length of the upper portion of base assembly 15 along the X-axis, or it may be comprised of a plurality of individual hinges disposed along the upper portion of base assembly 15.

The requisite force required to rotate about hinge means 56 the worktable 12, and the aforementioned attached gantry assembly 22, can be provided by any suitable means such as a hydraulic system comprised of a hydraulic pump 58 coupled to a hydraulic cylinder 60 having an extendable piston rod 62. An end of rod 62 is provided with a bracket 64 having an opening therethrough for a pin 66. Pin 66 is rigidly coupled to an end surface of worktable 12 such that the bracket 64 and pin 66 form a pivot point. An end of cylinder 60 opposite bracket 64 is rotatably coupled to the base assembly 15 by means of a pin 68 and a restraining member, such as a cotter pin 70. A suitable hydraulic line 72 is provided to couple pump 58 to cylinder 60 whereby pressurized hydraulic fluid or, in the alternative air (not shown), may be introduced into cylinder 60, resulting in the extension of rod 62. A controller 74 is provided for controllably increasing or decreasing the pressure within cylinder 60 thereby causing the extension or retraction of piston rod 62 and, hence, the angle of inclination of worktable 12.

In operation, controller 74 would be activated to energize the pump 58, thereby providing cylinder 60 with, for example, pressurized hydraulic fluid. The resulting linear extension of rod 60 will apply an upwardly directed force to the pivot point comprised of bracket 64 and pin 66. This force will be transferred through the pivot point into worktable 12, resulting in the rotation of worktable 12 about hinge 56 in the direction indicated by the arrow shown as A. A further operation of controller 74 results in the hydraulic pump 58 maintaining cylinder 60 at a given hydraulic pressure, thereby causing worktable 12 to maintain a given angular inclination. Alternatively, suitable mechanical stops may be utilized in order to maintain the worktable at a desired inclination, the stops engaging the worktable at one or more predetermined desired angles. Thus, by controlling the operation of hydraulic pump 58 by means of controller 74 the worktable 12 may be positioned at a desired angle of inclination whereby dust and chips may freely fall to the floor due to the force of gravity. A suitable hydraulic system for so positioning worktable 12 may be comprised of a Model No. T 10 V-20-M type pump manufactured by Double A Products of Manchester, Mich. coupled to a Model No. H 61-2½-24 type cylinder manufactured by Milwaukee Cylinder of Cudahy, Wis.

Figure 2:
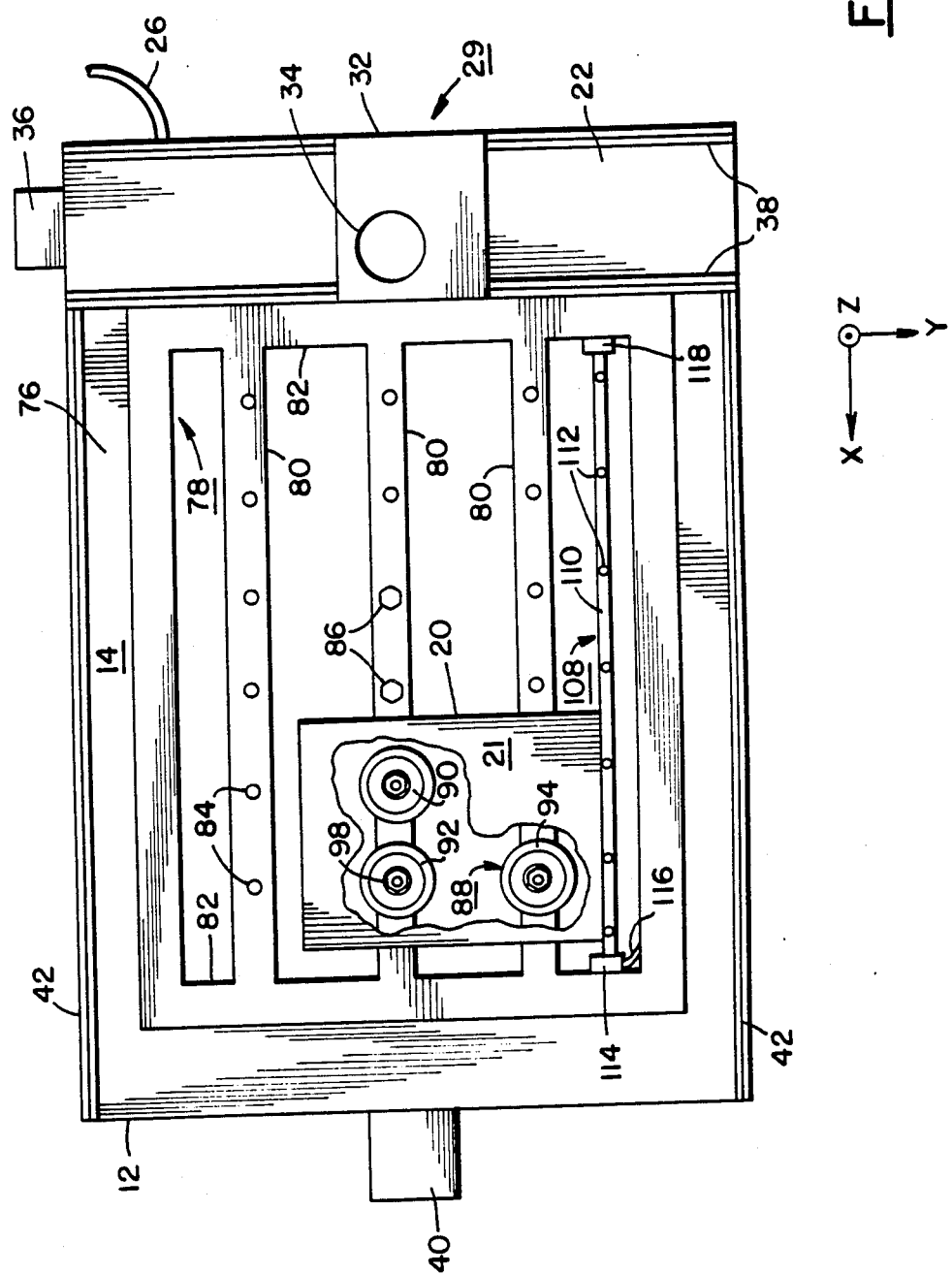
FIG. 2 is a top view of the worktable of the machining center of FIG. 1.

Referring now to FIG. 2 it can be seen that worktable 12 is comprised of a frame 76 disposed around and supporting a vacuum table 78. In accordance with one embodiment of the invention, vacuum table 78 is constructed in an open-frame manner having a plurality of hollow members 80 communicating at each end with two opposing sides of a similarly hollow rectangular outer vacuum frame 82. In the alternative, only one opposing side of frame 82, the side between vacuum holes 86 and vacuum line 26, may be a hollow vacuum frame. The other opposing side of frame 82 may be merely a plate or some other convenient component placed against the ends of hollow members 80 to assure an appropriate vacuum can be drawn through orifices 80 via the vacuum line 26. Disposed along the upper surface of each member 80 are a plurality of orifices 84, whereby the partial vacuum created within table 78 by pump 24 via vacuum line 26 may be utilized to immovably hold the workpiece 20 during machining.

Orifices 84 are provided with a means to be easily plugged when not required, such as when the area of the workpiece is less than the area of the vacuum table 78. In this embodiment of the invention each of the orifices 84 is suitably tapped such that a sealing means, such as a bolt 86 of the proper size, may be threaded therein, thereby plugging the orifice to prevent the loss of vacuum within table 78.

Those orifices 84 underlying workpiece 20, which orifices are required to hold the workpiece during machining, may be fitted with a vacuum coupler 88, three of which are shown in FIG. 2.

Figure 3:
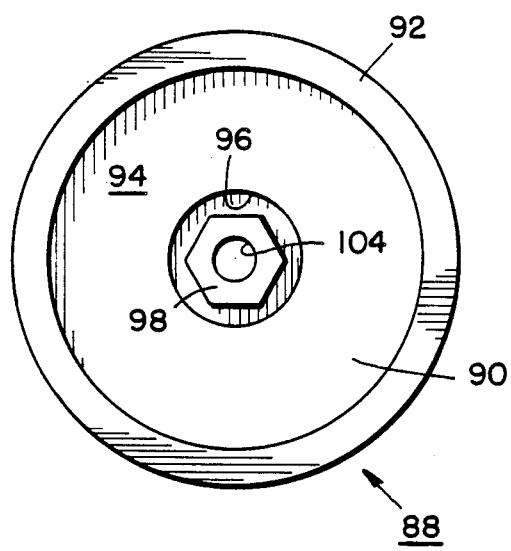
FIG. 3 is a top view of a vacuum coupler shown in FIG. 2.
Figure 4:
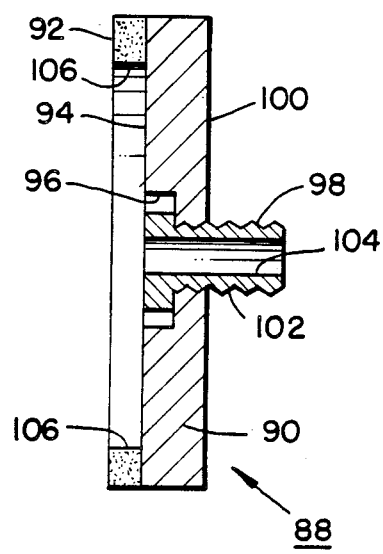
FIG. 4 is a sectional view of the vacuum coupler of FIG. 3.

Referring to FIGS. 3 and 4 in conjunction with FIG. 2 it can be seen that vacuum coupler 88 is comprised of a base 90 having a resilient rubber or rubber-like sealing gasket 92 affixed to an outer edge of front surface 94. A countersunk region 96 has a depth sufficient to accommodate the height of a bolt head within, the bolt 98 passing through base 90 and exiting a rear surface 100. Bolt 98 has threads 102 suitable for engaging the threaded orifices 84, whereby the coupler 88 may be affixed to vacuum table 78. An opening 104 made through bolt 98 allows for the reduced pressure within vacuum table 78 to be communicated to the back surface of workpiece 20. As may be realized, when the back surface of workpiece 20 overlies coupler 88, the volume defined by the back surface of workpiece 20, the inner edge 106 of sealing gasket 92, and the surface 94 of base 90 will be at reduced air pressure. This partial vacuum in contact with the back surface 21 of workpiece 20, in conjunction with the force exerted by the atmospheric pressure on the front surface of workpiece 20 will immovably hold the workpiece in place upon the inclined worktable 12. As may be realized, the base 90 may alternatively be provided with an integral rearwardly disposed threaded projection, thereby providing a coupler 88 of unitary construction.

If it is desired to provide a greater degree of support or a greater degree of vacuum holding pressure to the workpiece 20 the individual vacuum couplers 88 may be replaced with a single vacuum coupler comprised of a base having an area and a shape substantially identical to the workpiece. Such a single coupler would have a sealing gasket around the outer edge and be provided with an appropriate number of countersunk through holes in order to securely mount the coupler to the vacuum table 78 by means of, for example, hollow bolts 98.

In order to facilitate the loading, unloading and positioning of a workpiece the machining center 10 provides a workpiece support assembly 108. Assembly 108 is comprised of a bar 110 having a plurality of support members 112 projecting therefrom, the support members 112 being comprised of, for example, lengths of round or square bar stock fixed at one end to the bar 110. In order to prevent the interference of the members 112 with the tool 30 during the machining operation bar 110 is adapted to be rotated such that the members 112 are withdrawn from supportive contact with the workpiece. As may be seen, bar 110 is coupled at one end to a motor 114, the motor 114 being connected by a conductor 116 to a suitable energizing means (not shown). The opposite end of bar 110 is supported by a bearing assembly 118.

In operation, rotary motor 11, or in the alternative a suitably activated air cylinder or the like, is energized to rotate bar 110 such that support members 112 are orientated in an upwardly pointing fashion, as shown in FIG. 1. A workpiece to be machined would be placed upon vacuum table 78 such that the lower edge of the workpiece is supported by the members 112, the workpiece subsequently being positioned at a predetermined reference point along the X-axis. In order to facilitate such positioning, the members 112 at the extreme ends of bar 110 may be comprised of right angle stock suitable for accommodating a corner of the workpiece therein. After correctly positioning the workpiece the vacuum pump 24 is energized, thereby depressurizing vacuum table 78 and causing the workpiece to be immovably held thereon. Subsequent to the initiation of the machining operation motor 114 is energized to rotate bar 110 resulting in the attached members 112 being removed from supportive contact with the workpiece, the members rotating in the direction indicated by the arrow B of FIG. 1.

After the completion of the machining operation, and before the removal of the vacuum from table 78, motor 114 would be energized such that its direction of rotation is reversed, thereby causing the members 112 to be once more in supportive contact with the workpiece. Thereafter the vacuum pump 24 may be deenergized and the workpiece removed.

As may be more fully appreciated, a machining center having an inclinable worktable in accordance with the invention has a number of advantages over the horizontally fixed worktable machining centers of the prior art. As has been previously mentioned, one such advantage is that an operator may load and unload a workpiece without being unduly exposed to a risk of possible back injury. Another advantage is that the dust and chips not removed from the surface of the workpiece by the dust collector are removed due to the action of gravity.

A further advantage is that the lightweight, open-frame construction of the vacuum table and the simple nature of the vacuum coupling assembly therefore results in the creation of a versatile, quickly adaptable workpiece holding system. Another advantage of the open-frame construction of the vacuum table is that the removal of dust and chips is further facilitated due to the ability of this debris to fall from the worktable surface between the vacuum table members 80.

A still further advantage resulting from the invention is that an inclined worktable surface is more readily adaptable to automatic workpiece transfer systems. Inasmuch as a sheet of material may be more easily conveyed between machining centers when the material is conveyed along an edge instead of when lying flat, the inclination of the worktable surface results in the worktable being at a more advantageous position relative to such a conveyor system.

The above described embodiment may be modified in a variety of ways and those modifications may still be within the spirit and scope of the invention. For example, although a hydraulic system has been disclosed for imparting an inclination to the worktable relative to the base, the invention may also be practiced by the use of other means to incline the worktable, such as by a manual crank and gear assembly, or by a pulley and cable assembly. Also, although a gantry type of machining center is described with the inclinable worktable, other types of machining centers such as bridge or a turret types could also be used. Also, any suitable workpiece holddown means can be used with the inclinable table, such as C clamps.

The embodiment of the machining center discussed hereinabove has been described as having a workhead assembly 29 having a rotating spindle which holds machine tool 30. It is to be understood that the invention is not limited to a single workhead and may be utilized in a system with a plurality of workheads. For instance, it is common to employ two workheads which are able to work along their respective axes, such as the Z axis, either simultaneously or sequentially to machine the workpiece. In addition it is known to use two or more workheads which can conduct machining according to the instructions of the controller either simultaneously or sequentially along multiple axes of movement. All such alternative embodiments and their equivalents are intended to be encompassed within the invention described herein.

Thus, while this invention has been disclosed by means of a specific, illustrative embodiment, the principles thereof are capable of a wide range of modification by those skilled in the art within the scope of the following claims.

What is claimed is:

1. A machining center for the machining of workpieces of varying size and of various materials comprising:
   a worktable supported by a base assembly, said worktable comprising a worksurface upon which a workpiece is supported during machining, said worktable further comprising a vacuum holding means for immovably holding said workpiece during the machining thereof;
   a workhead assembly attached to said worktable and comprising a tool for machining said workpiece, said workhead assembly further comprising means for moving said tool relative to said workpiece; and
   means for controllably inclining said worktable and attached workhead assembly relative to said base assembly such that said workpiece can be immovably held in an inclined position during the machining thereof whereby dust and chips resulting from said machining are removed from said workpiece due to the force of gravity.

2. A machining center as defined in claim 1 wherein said means for controllably inclining comprises a hydraulic system, said hydraulic system comprising a hydraulic cylinder having an extendable piston rod rotatably coupled to said worktable for imparting a force upon said worktable.

3. A machining center as defined in claim 2 wherein said means for controllably inclining further comprises a hinge means rotatably coupling said worktable to said base assembly whereby when said force is imparted to said worktable said worktable is caused to rotate about said hinge, thereby inclining said worktable.

4. A machine as defined in claim 3 wherein said cylinder is disposed beneath said worktable such that the extension of said piston rod imparts an upwardly directed force upon said worktable.

5. A machining center as defined in claim 1 wherein said vacuum holding means comprises a vacuum table flexibly coupled to a vacuum generating means.

6. A machining center as defined in claim 5 wherein said vacuum table is comprised of a plurality of hollow members disposed in a spaced apart manner substantially parallel one to another, each of said hollow members communicating at each end with a surrounding hollow frame whereby said vacuum table may be uniformily partially evacuated by said vacuum generating means and whereby said vacuum table has an internal air pressure which is less than an atmospheric air pressure.

7. A machining center as defined in claim 6 wherein an upper surface of each of said hollow members has a plurality of orifices therethrough, each of said orifices being operable for communicating said internal air pressure of said vacuum table to a surface of a workpiece suitably coupled to said orifice.

8. A machining center as defined in claim 7 wherein each of said orifices is threaded whereby a threaded sealing means may be securely screwed therein thereby preventing said orifice from communicating said internal air pressure.

9. A machining center as defined in claim 8 wherein said workpiece is suitably coupled to said orifice by a vacuum coupler means having a hollow projection, said projection being suitably threaded such that said vacuum coupler means may be screwed to said orifice whereby said orifice may communicate said internal air pressure to said coupler through said hollow projection.

10. A machining center for the machining of workpieces of varying size and of various materials, said machining center comprising a base assembly and further comprising:
    a worktable supported by said base assembly, said worktable having a worksurface upon which a workpiece is supported during machining, said worktable comprising a vacuum table flexibly coupled to a vacuum generating means for immovably holding said workpiece during the machining thereof;
    a gantry assembly movably mounted on said worktable, said gantry assembly being adapted for movement in a first axis relative to said worktable, said gantry assembly comprising a workhead assembly movably mounted thereon, said workhead assembly being adapted for movement in a second axis perpendicular to and coplanar with said first axis, said workhead assembly comprising a machining tool movably mounted thereon, said tool being adapted for movement in a third axis perpendicular to said first and said second axis; and
    means for controllably inclining said worktable of said gantry assembly mounted thereon such that said workpiece is immovably held in an inclined position during the machining thereof whereby dust and chips resulting from said machining are removed from said workpiece due to the force of gravity.

11. A machining center as defined in claim 10 wherein said worktable further comprises a first servomotor, said first servomotor being adapted for moving said gantry assembly on said worktable.

12. A machining center as defined in claim 11 wherein said gantry assembly further comprises a second servomotor, said second servomotor being adapted for moving said workhead assembly on said gantry assembly.

13. A machining center as defined in claim 12 wherein said workhead assembly further comprises a third servomotor, said third servomotor being adapted for moving said tool in said third axis.

14. A machining center as defined in claim 13 wherein said workhead assembly further comprises a motor operably coupled to said tool for rotating said tool.

15. A machining center as defined in claim 13 wherein said first, second and third servomotors are each individually controlled by a controller whereby said tool may be accurately positioned at a predetermined point relative to said first, second and third axes.

16. A machining center as defined in claim 15 whereby said means for controllably inclining said worktable comprises a hydraulic system, said hydraulic system comprising a hydraulic cylinder having an extendable piston rod rotatably coupled to said worktable for imparting a force upon said worktable.

17. A machining center as defined in claim 16 wherein said means for controllably inclining further comprises a hinge means rotatably coupling said worktable to said base assembly whereby when said force is imparted to said worktable said worktable is caused to rotate about said hinge means, thereby inclining said worktable.

18. The machining center as defined in claim 17 wherein said cylinder is disposed beneath said worktable such that the extension of said piston rod imparts an upwardly directed force upon said worktable.

19. A machining center as defined in claim 10 wherein said vacuum table is comprised of a plurality of hollow members disposed in a spaced apart manner substantially parallel one to another, each of said hollow members communicating at each end with a surrounding hollow frame whereby said vacuum table may be uniformly partially evacuated by said vacuum generating means and whereby said vacuum table has an internal air pressure which is less than an atmospheric air pressure.

20. A machining center as defined in claim 19 wherein an upper surface of each of said hollow members has a plurality of orifices therethrough, each of said orifices being operable for communicating said internal air pressure of said vacuum table to a surface of a workpiece suitably coupled to said orifice.

21. The machining center of claim 20 wherein each of said orifices is threaded whereby a threaded sealing means may be securely screwed therein thereby preventing said orifice from communicating said internal air pressure.

22. The machining center of claim 21 wherein said workpiece is suitably coupled to said orifice by a vacuum coupler means having a hollow projection, said projection being suitably threaded such that said vacuum coupler means may be screwed to said orifice whereby said orifice may communicate said internal air pressure to said coupler through said hollow projection.

23. A method of removing dust and chips from a workpiece during the machining of said workpiece, the machining being accomplished by a machining center comprising a base assembly supporting a worktable having a vacuum holding means for immovably holding the workpiece and a machining tool coupled to a positioning means supported by said worktable, the positioning means being operable for positioning the tool in an X, Y and Z coordinate reference system relative to said workpiece, comprising the steps of:
  positioning the workpiece on the worktable at a predetermined position relative the X, Y and Z coordinate reference system;
  activating said clamp means for immovably holding the workpiece in the predetermined position; and inclining the worktable and activating said machine tool to machine said workpiece while the worktable is at an angle which is sufficient to permit the force of gravity to remove dust and chips from the workpiece during the machining of the workpiece.

24. The method of claim 23 wherein the step of inclining is accomplished after the step of positioning.

25. The method of claim 23 wherein the step of inclining is accomplished before the step of positioning whereby said step of positioning is facilitated.

26. The method of claim 23 wherein the step of inclining further comprises the steps of:
  activating a hydraulic cylinder means to apply an upwardly directed force on the worktable; and
  rotating the worktable about a hinge means which rotatably couples the worktable to the base assembly.

27. The method of claim 23 wherein the clamp means is a vacuum table.

28. A method of facilitating the loading of a workpiece onto a worktable of a machining center and positioning the workpiece relative to a predetermined coordinate system relative to the worktable, the machining center having a tool coupled to a positioning means for positioning the tool within the coordinate system whereby the workpiece is machined, the machining center further having a vacuum holding means for immovably holding the workpiece during the machining thereof, comprising the steps of:
  inclining the worktable to an angle which facilitates the loading of a workpiece thereon;
  loading the workpiece upon the inclined worktable;
  positioning the workpiece upon the worktable such that the workpiece is disposed at a given position relative to the predetermined coordinate system;
  engaging the holding means whereby the workpiece is immovably held at the given position and adjusting the angle of inclination of said worktable to permit the force of gravity to remove dust and chips that form during the machining of the workpiece.

29. The method of claim 28 wherein the step of inclining further includes the step of activating a hydraulic cylinder means, the cylinder means being coupled to the worktable such that a force is applied to the worktable whereby the worktable is inclined.

30. The method of claim 28 wherein the step of positioning further includes the step of activating a supporting means whereby the workpiece is supported during the positioning thereof.

31. The method of claim 28 wherein the holding means is comprised of a vacuum table means and wherein the step of engaging includes the step of activating a vacuum generating means coupled to a vacuum table whereby the workpiece is immovably held at the given position.

32. The method of claim 28 wherein the step of loading is accomplished in a substantially automatic manner by a workpiece conveyor system.

33. The method of claim 28 wherein the step of loading is accomplished in a substantially manual manner by an operator.

* * * * *